United States Patent
Webb

(10) Patent No.: US 7,654,381 B2
(45) Date of Patent: Feb. 2, 2010

(54) CONVEYORS

(75) Inventor: Michael Webb, Fleet Hampshire (GB)

(73) Assignee: Quin Systems Limited (GB)

( * ) Notice: Subject to any disclaimer, the term of this patent is extended or adjusted under 35 U.S.C. 154(b) by 0 days.

(21) Appl. No.: 12/280,385

(22) PCT Filed: Feb. 22, 2007

(86) PCT No.: PCT/GB2007/050078

§ 371 (c)(1),
(2), (4) Date: Aug. 22, 2008

(87) PCT Pub. No.: WO2007/096672

PCT Pub. Date: Aug. 30, 2007

(65) Prior Publication Data

US 2009/0020390 A1    Jan. 22, 2009

(30) Foreign Application Priority Data

Feb. 22, 2006    (GB) ................... 0603461.5

(51) Int. Cl.
B65G 47/26    (2006.01)
B65G 47/34    (2006.01)
(52) U.S. Cl. .................... 198/431; 198/430; 198/419.3
(58) Field of Classification Search ............. 198/419.3, 198/418.7, 419.2, 418.5, 426, 428–431
See application file for complete search history.

(56) References Cited

U.S. PATENT DOCUMENTS

| 3,680,678 A | * | 8/1972 | Ganz ........................ 198/418.1 |
| 4,633,652 A | | 1/1987 | Dagenais |
| 4,768,642 A | * | 9/1988 | Hunter ..................... 198/419.2 |
| 5,203,444 A | * | 4/1993 | Munch ..................... 198/418.7 |
| 6,019,213 A | * | 2/2000 | Schubert .................. 198/419.3 |
| 6,209,708 B1 | | 4/2001 | Phillipp |
| 6,691,856 B1 | * | 2/2004 | Prakken ................... 198/419.3 |

FOREIGN PATENT DOCUMENTS

| GB | 906379 | 9/1962 |
| GB | 1082676 | 9/1967 |
| GB | 1199398 | 7/1970 |
| GB | 2097744 A | 11/1982 |
| GB | 2186855 A | 8/1987 |
| WO | WO-03/059746 A1 | 7/2003 |

* cited by examiner

*Primary Examiner*—Mark A Deuble
(74) *Attorney, Agent, or Firm*—Barnes & Thornburg LLP

(57) ABSTRACT

An indexing conveyor 1 travels at (90) degrees to a wrapping output conveyor (2), which conveys elongate packs (3) of circular biscuits at high speed with their diameter-ends leading. The indexing conveyor 1 receives the packs (3) and conveys them in an orthogonal direction, with their long-dimensions leading. The indexing conveyor (1) has a regular series of V-section lugs (11), which receive and center the packs (3) and can accommodate a range of diameters of circular packs (3) while maintaining a constant pitch. A pair of lifting bars (12) lifts a group (31) of packs (3) at a time during the dwell period of the index of the (10) conveyor (1). The packs (3) of each group (31) are moved together during the lift so that they are touching, to ensure that a robotic pick-and-place system can pick up the group (31) reliably.

7 Claims, 1 Drawing Sheet

CONVEYORS

The present invention relates to conveyors and is concerned particularly, although not exclusively, with the handling of elongate packs of circular cross-section.

Elongate circular-section packs may contain, for example, a stack of circular biscuits in a flexible wrapping. There is a requirement to change the direction of travel of elongate circular-section packs from diameter-end-leading, as typically produced from a wrapping machine, to long-dimension-leading, to make it easier to hand pack the packs into cases.

A method currently used is simply to feed the diameter-edge-leading packs from a first conveyor onto a second conveyor travelling at 90 degrees to the first conveyor. For low speed and hand packing this may be satisfactory, provided that the packs do not change their angle very much during the transfer from one conveyor to the other and what change there is can easily be corrected by people hand packing the cases.

However, where it is required to automate the packing of cases and to be able to handle packs from the wrapping machine at much higher speeds (at least double), such known methods are insufficiently accurate.

Preferred embodiments of the present invention aim to provide methods and apparatus that can be improved in this respect.

According to one aspect of the present invention, there is provided a method of conveying products, comprising the steps of conveying products sequentially on a first conveyor and receiving the products sequentially on a second conveyor travelling transversely of the first conveyor, wherein the second conveyor indexes each time that it receives a product from the first conveyor and the second conveyor comprises a series of compartments, each of which receives a respective one of the products and holds it against movement longitudinally of the second conveyor.

According to another aspect of the present invention, there is provided apparatus for conveying products, comprising a first conveyor arranged to convey products sequentially and a second conveyor arranged to travel transversely of the first conveyor, to receive products sequentially from the first conveyor and to index each time that it receives a product from the first conveyor, wherein the second conveyor comprises a series of compartments, each of which receives a respective one of the products and holds it against movement longitudinally of the second conveyor.

Preferably, said compartments have inclined sides.

Preferably, said products are elongate.

Preferably, said products are of circular cross-section.

Preferably, said products are packs of circular items. For example, said items may be round biscuits.

Preferably, said first conveyor is an output conveyor from a wrapping machine.

Preferably, a grouping means is arranged to remove a group of products from said second conveyor.

Preferably, said grouping means is arranged to urge the products of a group together after and/or during removal of the products from said second conveyor.

Preferably, said grouping means comprises a lifting mechanism arranged to engage ends of the products that overhang the sides of the second conveyor.

Preferably, said grouping means is arranged to remove a group of products from said second conveyor during intervals between indexing movements of the second conveyor.

Preferably, retaining means is arranged to limit movement of products in said compartments transversely of the direction of movement of said second conveyor.

For a better understanding of the invention, and to show how embodiments of the same may be carried into effect, reference will now be made, by way of example, to the accompanying diagrammatic drawings, in which.

In the figures, like references denote like or corresponding parts.

Figure 1:
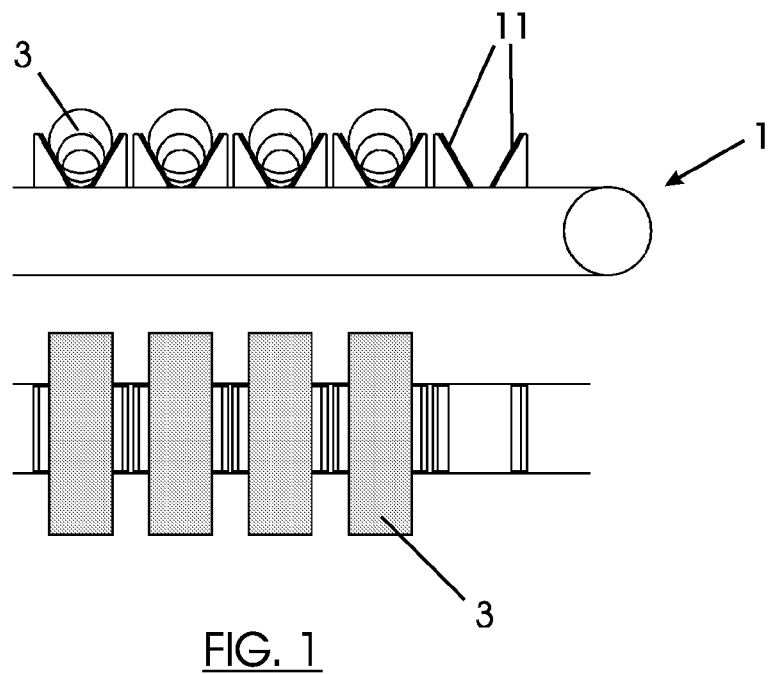
FIG. 1 illustrates a conveyor in side view and plan view.
Figure 2:
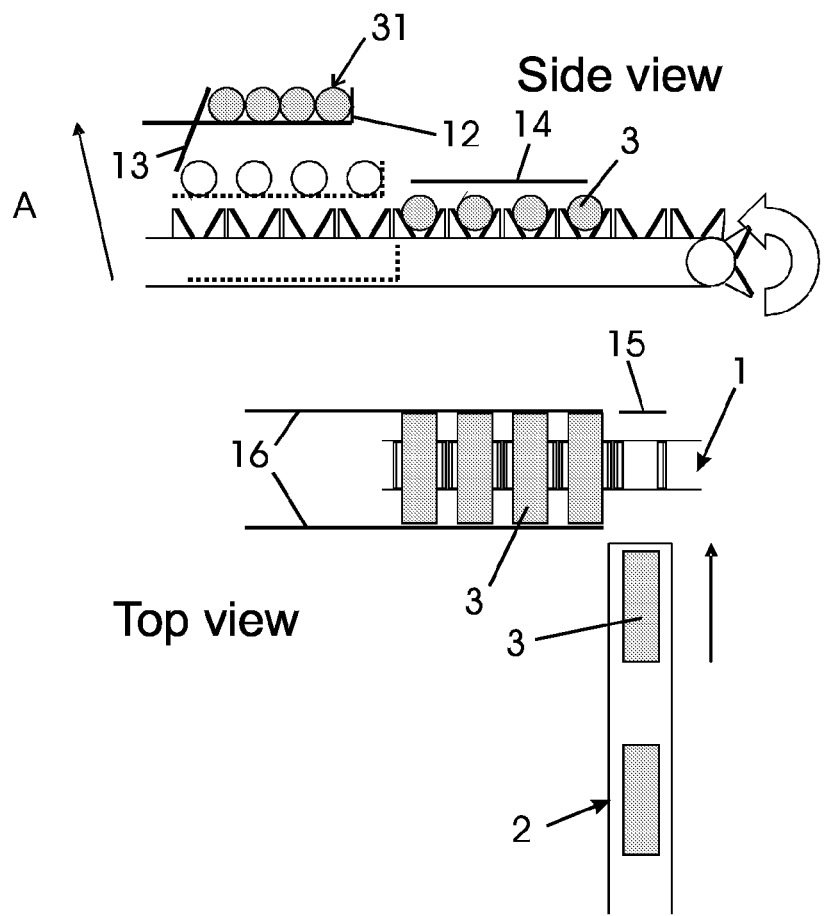
FIG. 2 illustrates the conveyor of FIG. 1 in use in an apparatus and method for pack handling.

The conveyor 1 shown in FIG. 1 is an indexing conveyor rather than a continuously running conveyor—that is, it is arranged to travel in predetermined increments with intervals between each increment of travel. The conveyor 1 is arranged to travel at 90 degrees to a wrapping output conveyor 2 (as shown in FIG. 2) which conveys elongate packs 3 of circular cross-section in an axial direction—that is, with their diameter-ends leading. For example, each pack 3 may contain a stack of circular biscuits.

Packs 3 are continuously fed at high speed and at regular intervals from the output conveyor 2 to the indexing conveyor 1, which receives the packs 3 and conveys them in a direction orthogonal to that of the output conveyor 2—that is, with their long-dimensions leading. The indexing conveyor 1 indexes a pack at a time and is always ready to receive the next pack from the output conveyor 2 at full pack rate. The output conveyor 2 typically runs continuously, but could also be indexed, to synchronise with the indexing of the conveyor 1.

The indexing conveyor 1 is provided with a regular series of inclined lugs 11, which define V-section section channels that receive and centre the packs 3 between the lugs 11, with a single pack 3 between a respective pair of lugs 11. The lugs 11 are arranged symmetrically in this embodiment (they could alternatively be asymmetrical) and can accommodate a range of diameters of circular packs 3 whilst maintaining a constant pitch. The lugs 11 ensure that the packs 3 do not change their angle during transfer from the wrapping output conveyor 2.

The lugs 11 keep the packs 3 in position whilst the conveyor 1 (typically a belt conveyor) carries out fast indexes with high accelerations. Options include a height adjustable guide bar 14 over the top of the packs 3, an adjustable end stop 15 and adjustable side guides 16, to further restrain unwanted movement of the packs 3.

As seen in FIG. 2, a pair of lifting bars 12 is arranged to lift a group 31 of packs 3 at a time during the dwell period of the index of the conveyor 1. The lifting bars 12 are mounted parallel to the indexing conveyor 1 and under the ends of the packs 3, which overhang the sides of the conveyor 1. One method of operation is for the lifting bars 12 to reciprocate up and down with a means to fold the bars out of the way during their return downward stroke in readiness for the next group lift, the return downward stroke preferably occurring whilst the conveyor 1 is indexing to receive the next group. Another method is to use a series of bars 12 that could be mounted on vertically oriented chains or belts which are indexed in the same direction each time a group lift is required.

The packs 3 of each group 31 are moved together during the lift so that they are touching. This ensures that an automated (robotic) pick-and-place system can then pick up the group 31 reliably, ensuring that the packs 3 fit in the shortest case possible and provide an even layer in the case. This can be achieved in a number of ways, which include adjustable upright mounted angled guides 13 or by mounting the lifting bars 12 on a rocker. The packs 3 can be lifted through an arc and into an end stop to ensure they come together, as shown in FIG. 2. One possible direction of movement of the lifting bars 12 is shown by the arrow A.

Instead of a lifting mechanism, a horizontal pushing mechanism may be employed to push a group of packs 3 from the indexing conveyor during its index dwell period.

By way of example, packs such as the packs 3 may have diameters in the range 20 mm to 100 mm and lengths in the range 100 mm to 300 mm. Packs other than those of exact circular cross-section may be handled by apparatus and methods as disclosed herein.

In this specification, the verb "comprise" has its normal dictionary meaning, to denote non-exclusive inclusion. That is, use of the word "comprise" (or any of its derivatives) to include one feature or more, does not exclude the possibility of also including further features.

The reader's attention is directed to all and any priority documents identified in connection with this application and to all and any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of conveying products, the method comprising the steps of conveying elongate products of circular cross-section sequentially on a first conveyor and receiving the products sequentially on a second conveyor travelling transversely of the first conveyor, wherein the second conveyor indexes each time that it receives a product from the first conveyor and the second conveyor comprises a series of compartments, each of which receives a respective one of the products and holds it against movement longitudinally of the second conveyor, the method comprising the further step of removing a group of products from said second conveyor by means of a lifting mechanism that engages ends of the products that overhang the sides of the second conveyor.

2. A method according to claim 1, wherein said compartments have inclined sides.

3. A method according to claim 1, wherein said products are packs of circular items.

4. A method according to claim 3, wherein said items are round biscuits.

5. A method according to claim 1, wherein said first conveyor is an output conveyor from a wrapping machine.

6. A method according to claim 1, wherein said lifting mechanism is arranged to remove a group of products from said second conveyor during intervals between indexing movements of the second conveyor.

7. A method according to claim 1, wherein retaining means is arranged to limit movement of products in said compartments transversely of the direction of movement of said second conveyor.

* * * * *